(No Model.)

W. A. BELL.
ROTARY HARROW.

No. 245,341. Patented Aug. 9, 1881.

Witnesses
Geo. H. Strong.
Frank A. Brooks

Inventor
William A. Bell
By Dewey & Co.
Attys

UNITED STATES PATENT OFFICE.

WILLIAM A. BELL, OF ADELAIDE, CALIFORNIA.

ROTARY HARROW.

SPECIFICATION forming part of Letters Patent No. 245,341, dated August 9, 1881.

Application filed April 21, 1881. (No model.)

*To all whom it may concern:*

Be it known that I, WILLIAM A. BELL, of Adelaide, county of San Luis Obispo, State of California, have invented an Improved Rotary Harrow; and I hereby declare the following to be a full, clear, and exact description thereof.

My invention relates to the class of rotary harrows, and more especially to certain improvements in the balance and draft bars thereof.

It consists in rendering the draft-bar adjustable, for purposes hereinafter set forth, and in necessary attachments to said draft-bar whereby its adjustment is effected.

It further consists in an improved balance-bar, its novelty consisting in its adjustability from one side of the harrow to the other, or at any point between, to adapt the implement to all kinds of work.

Figure 1:
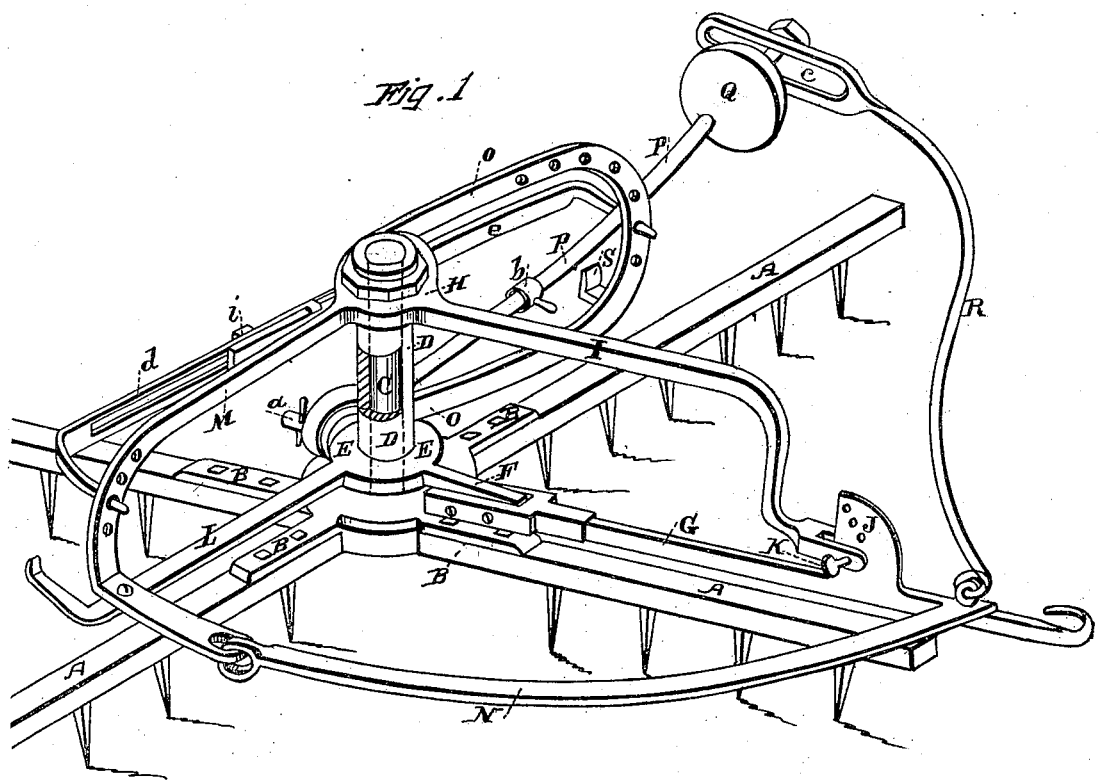
Figure 2:
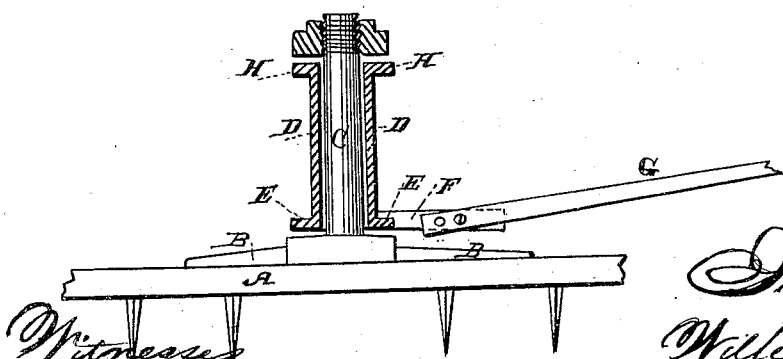

Referring to the accompanying drawings, Figure 1 is a perspective view. Fig. 2 is a vertical section.

Let A represent the frame of a harrow having appropriate teeth. To this frame is attached the vertical spindle C by means of the arms B, said spindle carrying the hub D, turning upon it and secured to it by a nut above, as shown. A collar or flange, E, upon the base of the hub D, has projecting horizontally from it an arm, F, to which is jointed the draft-bar G. Any kind of a joint or hinge which will allow the draft-bar to describe a vertical arc—*i. e.*, to be raised or lowered—will here answer; but for the present purpose I have shown the bifurcated end of the draft-bar fitting the projecting arm or support F, and pivoted thereto to allow the forward end to be raised or lowered about the pin as a center.

In order to retain the draft-bar in position, I have constructed certain braces and supports as follows:

On the top of the hub D is the collar or flange H. Projecting from it horizontally over the draft-bar, and then curved down toward said bar, is the brace I. The forward end of said brace is forked, its prongs passing on each side of a vertical rack, J, attached to the draft-bar. The rack J is perforated with a series of holes, as shown, to receive a pin or key, K, which passes through both prongs of the brace I and the rack J, and thus retains the draft-bar wherever adjusted.

Projecting horizontally from the lower collar, E, at right angles to the draft-bar, is the supporting arm or bar L, having its outer end turned backward and upward in a hook or support.

From the upper collar, H, projecting horizontally at right angles to the curved brace I, is a curved rack support or bar, M, passing down and bent forward upon the arm L, to which it is attached.

To the end of the brace M is hinged or jointed the horizontal curved brace N, the other end of which is attached rigidly to the forward end of the draft-bar. This brace resists side draft upon the draft-bar and prevents any side play, while still allowing (because of its joint) the draft-bar to be adjusted vertically. Attached to the upper collar, H, and projecting oppositely to the rack-bar M, is the curved rack bar or support O, the other end of which is attached to an arm or projection, *a*, extending from the rear of the lower collar, E. Both the curved rack-supports M and O are provided with holes, as shown, correspondingly placed on each.

P represents the balance-bar with its weight Q on its outer end. Its inner end is journaled upon the arm *a* in the rear of the hub, and is secured thereon by a key, as shown. A staple, pin, or collar, *b*, slides upon the balance-bar P, and may be fitted into any of the holes in the curved rack, and thus hold the balance-bar and weight in any required angle.

R is a curved brace, jointed or hinged to the front of the draft-bar in any practicable manner, (shown here by hook and staple.) Its rear end is provided with an extended seat, *c*, and fits over the end of the balance-bar P, outside of the weight Q, and is secured thereon by a nut. This brace R supports the balance-bar P and allows it to be changed from one side of the harrow to the other, the slot in its end being necessary to allow the vertical adjustment of the draft-bar G.

S represents a hook attached to the curved rack O. In this hook and in the hooked end of the arm or bar L the balance-bar may rest in a position on either side of the harrow.

When the direction of the rotation of the harrow needs to be frequently changed, as in side-hill work, the means here described for retaining the balance-bar in position would not be convenient, because of the necessity of removing the staple or pin b from the hole in one rack-bar and inserting it again in the other when the balance-bar is changed to the other side in order to change the revolution. To provide a more convenient support in such a case, I here show a device consisting of the bars d and e, having inwardly-turned points for fitting the holes in the rack-bars. One of the rack-bars, d, has an extended slot, as shown, in which a stud, i, upon the end of the bar e travels. The bar e has slightly-beveled edges, which are clasped by flanges upon the end of the bar d. It will be seen that this device makes an extensible bar or rod. It may consequently be made to fit its points in any two opposite holes upon the curved rack-bars. When the balance-bar has to be changed from side to side frequently, it can easily be done by putting this supporting device under it at the required elevation.

By raising or lowering the adjustable draft-bar G the pitch of the harrow in the line of the draft is changed. This adapts the motion of rotation to foul ground, enabling the harrow to clear itself in heavy weeds, wet grain, and flax-straw.

The advantage of the adjustable balance-bar P is in the fact that it adapts the harrow generally to all kinds of work on level or hill-side ground, in soil stiff and full of clods, and in weedy or foul fields, &c. The ease with which the balance-bar and weight may be changed from one side of the harrow to the other renders the implement especially useful where the direction of rotation has frequently to be changed.

Having thus described my invention, what I claim as new, and desire to secure by Letters Patent, is—

1. In a rotary harrow having a vertical spindle, C, carrying a hub, D, the draft-bar G, hinged or jointed to the hub or to a collar or flange thereon so as to be adjusted vertically, said draft-bar being retained in place by the curved support I, engaging with the vertical rack J upon said bar, and braced laterally by the jointed or hinged curved horizontal brace N, substantially as described.

2. In a rotary harrow, the vertically-adjustable draft-bar G, with its braces I and N, and rack J, or equivalent device, substantially as described.

3. In a rotary harrow having a spindle, C, carrying a hub, D, the balance-bar P, with its weight Q, and journaled to the rear of the hub D, and having means, substantially as described, for supporting said balance-bar P in the manner and for the purpose set forth.

4. In a rotary harrow, the combination of the perforated curved rack supports or bars M and O, adjustable balance-bar P, with its weight Q, extensible supporting-bars d e, and the curved brace or arm R, hinged or jointed to the front of the draft-bar, and having its rear end provided with an extended slot fitting the end of the balance-bar, substantially as herein described.

5. In a rotary harrow having a spindle, C, and hub D, the combination of the adjustable balance-bar P, with its weight Q, the perforated curved racks M and O, and the extensible supporting device, consisting of the bars d and e, with their points fitting the holes in the curved racks, substantially as described.

6. The rotary harrow herein described, consisting of the harrow-frame A, with appropriate teeth, the arms B, spindle C, and hub D, with its vertically-adjustable hinged or jointed draft-bar G, braced and supported as shown, and the adjustable balance-bar P, with its weight Q, and journaled to the rear of the hub D, braced as shown, and retained in position when adjusted by appropriate devices fitting rack-bars M and O, substantially as herein described.

In witness whereof I have hereunto set my hand.

WILLIAM A. BELL.

Witnesses:
EDWIN SMITH,
S. H. NOURSE.